United States Patent
Torbitt et al.

(10) Patent No.: US 10,508,765 B2
(45) Date of Patent: Dec. 17, 2019

(54) EXTENDIBLE TRIPOD LEG

(71) Applicant: THE VITEC GROUP PLC, Richmond (GB)

(72) Inventors: Jolyon Torbitt, Suffolk (GB); James Brady, Suffolk (GB); James Guest, Suffolk (GB)

(73) Assignee: THE VITEC GROUP PLC, Richmond (GB)

( * ) Notice: Subject to any disclaimer, the term of this patent is extended or adjusted under 35 U.S.C. 154(b) by 0 days.

(21) Appl. No.: 15/557,241

(22) PCT Filed: Feb. 10, 2016

(86) PCT No.: PCT/GB2016/050311
§ 371 (c)(1),
(2) Date: Sep. 11, 2017

(87) PCT Pub. No.: WO2016/142646
PCT Pub. Date: Sep. 15, 2016

(65) Prior Publication Data
US 2018/0051849 A1  Feb. 22, 2018

(30) Foreign Application Priority Data
Mar. 12, 2015  (GB) .................................. 1504215.3

(51) Int. Cl.
*F16B 7/10* (2006.01)
*F16M 11/36* (2006.01)
(Continued)

(52) U.S. Cl.
CPC .............. *F16M 11/36* (2013.01); *B25G 1/04* (2013.01); *F16B 7/10* (2013.01); *F16B 7/1454* (2013.01);
(Continued)

(58) Field of Classification Search
CPC ........ F16M 11/36; F16M 11/32; F16M 11/38; F16M 11/40; F16M 11/425; F16B 7/1463;
(Continued)

(56) References Cited

U.S. PATENT DOCUMENTS 4,840,338 A * 6/1989 O'Connor ............... F16B 7/105
248/168
5,289,782 A * 3/1994 Rizzi ....................... A47B 9/02
108/146
(Continued)

FOREIGN PATENT DOCUMENTS

DE  29506605 U1  6/1995
GB  2210259 A  6/1989

OTHER PUBLICATIONS

International Search Report dated Jun. 2, 2016 in corresponding International Patent Application No. PCT/GB2016/050311.

*Primary Examiner* — Nkeisha Smith
(74) *Attorney, Agent, or Firm* — Pepper Hamilton LLP

(57) ABSTRACT

An extendable leg 10 for a tripod, the leg 10 comprises two or more leg-stages 11*b*, 11*c*, each leg-stage 11*b*, 11*c* moveable axially relative to one or more of the or each other leg-stages to lengthen or shorten the leg. The leg 10 includes a clamp assembly to releasably prevent the relative movement when the leg is at the desired length. The clamp assembly includes a leg brake 22*a* moveable between a first leg-stage locking position and a second leg-stage release position. In order to control movement of the leg brake 22*a* between the first and second positions, an actuation means 16 is provided. A cable 17 is operably connected at a first end to the actuation means 16 and at a second end to the leg brake 22*a*, such that operation of the actuation means 16 causes the cable 17 to move the leg brake 22*a*.

14 Claims, 9 Drawing Sheets

(51) Int. Cl.
  *B25G 1/04* (2006.01)
  *F16M 11/32* (2006.01)
  *F16B 7/14* (2006.01)
  *F16M 11/38* (2006.01)

(52) U.S. Cl.
  CPC ............ *F16M 11/32* (2013.01); *F16B 7/1463* (2013.01); *F16M 11/38* (2013.01)

(58) Field of Classification Search
  CPC . F16B 7/1454; F16B 7/10; B25G 1/04; A47B 2200/0051; A47C 3/20; A47C 3/40
  USPC ...................................................... 248/163.1
  See application file for complete search history.

(56) References Cited

U.S. PATENT DOCUMENTS

| | | | | |
|---|---|---|---|---|
| 5,398,622 | A * | 3/1995 | Lubinskas | A47B 21/02 108/145 |
| 5,682,825 | A * | 11/1997 | Manner | A47B 9/02 108/144.11 |
| 6,026,755 | A * | 2/2000 | Long | A47B 9/02 108/147 |
| 6,286,795 | B1 | 9/2001 | Johnson | |
| 2010/0282921 | A1* | 11/2010 | Hein | F16M 11/32 248/125.8 |
| 2012/0205510 | A1 | 8/2012 | Fortier | |
| 2013/0214111 | A1 | 8/2013 | Bishop | |

* cited by examiner

EXTENDIBLE TRIPOD LEG

CROSS REFERENCE TO RELATED APPLICATIONS

This application is a national phase filing under 35 U.S.C. § 371 of International Patent Application No. PCT/GB2016/050311, filed Feb. 10, 2016, which claims priority to Great Britain Application No. 1504215.3 filed Mar. 12, 2015 both of which are incorporated herein by reference in their entirety.

FIELD OF THE INVENTION

The present invention relates to an improved adjustable leg, primarily for use on a tripod designed to carry for example, a camera or other load. The leg is particularly suitable in allowing adjustment of the length of the tripod leg using only one hand.

BACKGROUND TO THE INVENTION

Tripods are well known for use where support needs to be provided, in a stable fashion, for devices such as cameras or theodolites whilst the device is in operation. The tripod firstly reduces the risk of movement of the device occurring during such operation and also leaves the operator free to carry out other tasks.

A typical tripod comprises a platform mounted on legs with each leg being mounted at an equal distance from each of the other two legs.

The platform can have attachment means for the device and other components and also electrical connections enabling the device to be operated remotely if required.

Additionally, the length of a leg can be lengthened or reduced to seat the device at the appropriate height. Normally also, each leg is individually adjustable in length to allow the tripod to be used on uneven ground.

Because the mass of the tripod and camera combined can be large, in some cases of the order of 90 kg, it is important that adjustments to the height of the tripod be easily achievable and preferably made through the use of only one hand. This leaves the user able to stabilise and support the device and/or operate the device whilst making said adjustments.

To this end tripods can be provided having legs which are independently telescopically extendable and retractable, and in which a leg has two or more leg sections of different diameters which sections can slide relative to one another, so changing the leg length. Sections are locked into position when at the correct length.

In order to Improve the ergonomics of extending and retracting the legs, a single operating lever can be used to operate all of the mechanisms that lock the sections of a leg together. A further, operating mechanism is then provided to link the single operating lever to the remote locking mechanisms. This remote operating mechanism has to include a means of allowing for the relative movement of the remote locking mechanisms as the leg sections slide relative to one another.

However, prior art mechanisms are relatively cumbersome and employ heavy mechanical linkages, such as torsion rods and/or push rods which detract from the ease of use of the tripod and also makes the tripod more expensive to manufacture and difficult to carry.

It is an object of the invention to provide a tripod leg which has robust and relatively lightweight mechanisms to address the above problems.

SUMMARY OF THE INVENTION

According to a first aspect of the invention there is provided an extendable leg for a tripod, the leg comprising two or more leg-stages, each leg-stage moveable relative to one or more of the or each other leg-stages to lengthen or shorten the leg;
a first clamp assembly to releasably prevent the relative movement when the leg is at the desired length;
the first clamp assembly including a leg brake moveable between a first leg-stage locking position and a second leg-stage release position;
actuation means controlling movement of the leg brake between the first and second position;
a cable operably connected at a first end to the actuation means and at a second end to the leg brake, such that operation of the actuation means causes the cable to move the leg brake.

The use of the cable allows for relative movement between the actuating means and the leg brake. It also allows for a lighter leg and also more robust operation.

Preferably the cable is multi-stranded and yet further preferably the cable is a Bowden type cable having a central wire encased in a tubular casing.

Alternatively, the cable consists of two or more sections, one or more of which includes a rigid outer casing and one or more of which includes a flexible outer casing.

Further alternatively, the cable is at least partially surrounded by an outer casing, the outer casing comprising a linear arrangement of rigid segments, each rigid segment being pivotally mounted to each of the adjacent segments.

Use of such cables allows light yet strong components to be used and minimises the need for adjustment of the locking mechanism.

The leg brake advantageously includes at least one arm having a distal end leg engagement means to frictionally engage a leg surface and prevent the relative movement of two leg-stages. Further advantageously, the leg brake is pivotably mounted, the pivoting action bringing the leg brake from a leg releasing position to a leg locking position. Optionally alternatively the leg brake is mounted on a rack and pinion mechanism to move the leg brake between the two positions.

The leg brake conveniently includes a second arm which further conveniently is also pivotably mounted and linked to the first arm such that pivoting of the first arm between the first and second positions also causes the second arm to move between a first and a second position. Still yet further conveniently, the second arm includes at its distal end a leg engagement means to engage a leg surface and resist movement. Still yet further conveniently, the link between the first and second arms is provided by a fishtail arrangement.

Preferably the leg includes a spring mounted to the first arm, and biasing the first leg brake to the non-engaging position.

Optionally the leg includes a guide sleeve to maintain axial alignment between leg-stages which acts to stabilise the leg and also minimises unwanted turning forces within the leg.

Preferably the leg includes a guide rail to guide the position of the cable and also limit relative axial movement between leg-stages and further preferably the distal end of the guide rail is curved axially inwardly. This feature minimises wear on the cable and also acts to prevent the leg-stages from retracting too far within the leg.

The leg advantageously includes three leg-stages, to allow the tripod leg to extend further without the need to lengthen the leg-stages, namely an outer, middle and inner leg-stage, and further includes a second clamp assembly, the first and second clamp assemblies being mounted to the middle leg-stage, and yet further advantageously the first clamp assembly acting to releasably prevent relative movement of the outer and middle leg-stages and the second clamp assembly acting to releasably prevent relative movement of the middle and inner stages.

Preferably the second assembly is operatively linked to the first clamp assembly, actuation of the first clamp assembly causing actuation of the second clamp assembly. This minimises the actions required by the user to operate both clamp assemblies, reduces the weight due to fewer components being required and ensures simultaneous operation of the clamp assemblies. The first and second clamp assemblies are further preferably linked by means of a wire or rod. Yet further preferably the wire or rod is attached at a first end to the leg brake of the first clamp assembly and at a second end to the leg brake of the second clamp assembly, to minimise the number of connections required.

Preferably the tubular casing of the Bowden cable connecting the actuating means to the first clamp assembly is attached to a lever, attached to the same ever is a cable connecting to the second clamp assembly. Thus the inner cable of the Bowden cable is connected to the first clamp assembly and the outer sheath of the Bowden cable is connected to the second clamp assembly. This arrangement allows equal force to be transmitted from the actuating means to the two clamp assemblies regardless of differences in position caused by assembly or wear.

According to a further aspect of the invention there is provided a jib, crane or other apparatus for supporting a video camera which apparatus includes a means for varying the length of one or more of its operating members for adjustment or transport purposes through the use of two or more telescopic stages which can be locked relative to each other as described in the above.

According to a yet further aspect of the invention, there is provided a tripod or stand or other apparatus for supporting broadcast equipment which apparatus includes a means for varying the length of one or more of its operating members for adjustment or transport purposes through the use of two or more telescopic stages which can be locked relative to each other as described in the above. Preferably, the equipment is light or audio equipment.

BRIEF DESCRIPTION OF THE DRAWINGS

The invention is now described with respect to the accompanying drawings which show by way of example only two embodiments of a tripod leg clamping mechanism. In the drawings.

DETAILED DESCRIPTION OF THE INVENTION

Figure 1:
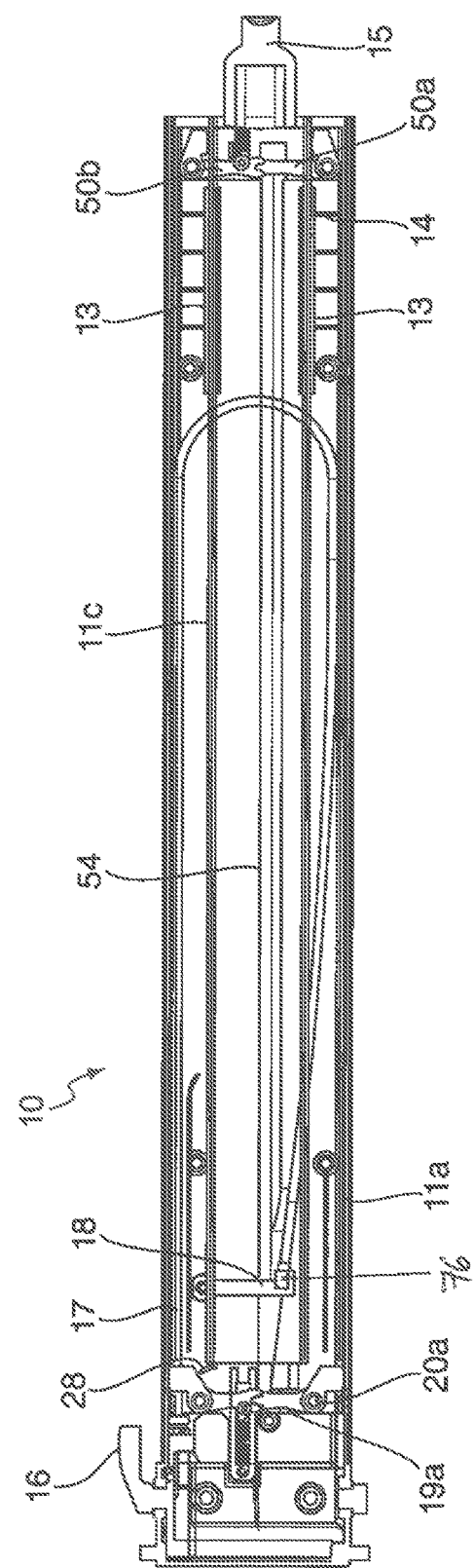
FIG. 1 is a section through a first embodiment of a tripod leg showing three leg-stages in the retracted configuration.

Referring initially to FIG. 1, this illustrates a first embodiment of a tripod leg, generally referenced 10. The leg 10 illustrated has three leg-stages which can move telescopically relative to each other, with a locking arrangement for the movement being controlled through a handle which can be simply operated by a user using only one hand. The leg, when incorporated into a tripod therefore enables said user to use their free hand to, for example, control the device being supported by the tripod. It should be appreciated that a leg can have further telescopic leg-stages without departing from the scope of the invention.

It is important that the locking arrangement be capable of supporting the mass of the device with no risk of slippage and also to withstand the torsion which can act on the legs of a tripod: particularly if the device or tripod is rotated.

In general, the tripod comprises two main elements: the head (or platform) and the legs. The head is mounted on the legs and is designed to support a device so that the user is free to carry out other tasks or simply just support the device more stably than a user can achieve by hand alone. The head can include other features such as ports for power or control cables. Tripods are most particularly used for devices such as cameras, telescopes or measuring apparatus such as theodolites.

A further important feature of a tripod is its weight as if this is too high then the user will have difficulty in transporting the tripod or setting it up. The tripod legs shown in FIG. 1 and the remaining Figures are designed to be both easily and accurately operated and of low overall weight. The materials from which components of the leg are formed are well known in the art and can be, for example, a carbon fibre material, aluminium, steel or a plastics material. If desired a protective and/or decorative coating can be applied to increase the corrosion resistance or aesthetic characteristics of the finished article.

Figure 2:
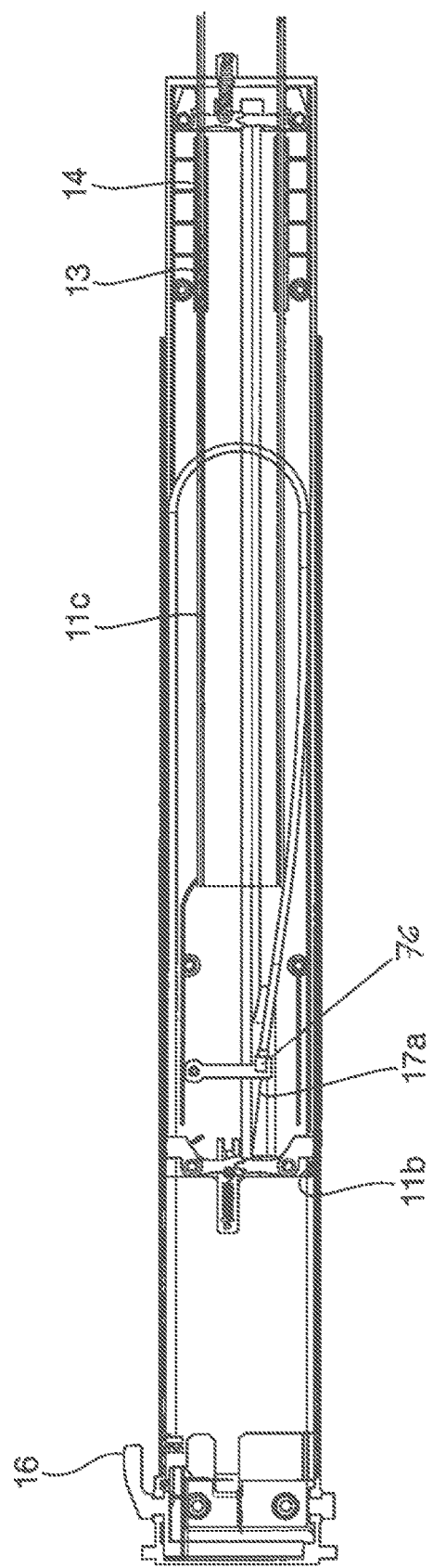
FIG. 2 is a section through the tripod leg of FIG. 1 in partially extended configuration.
Figure 3:
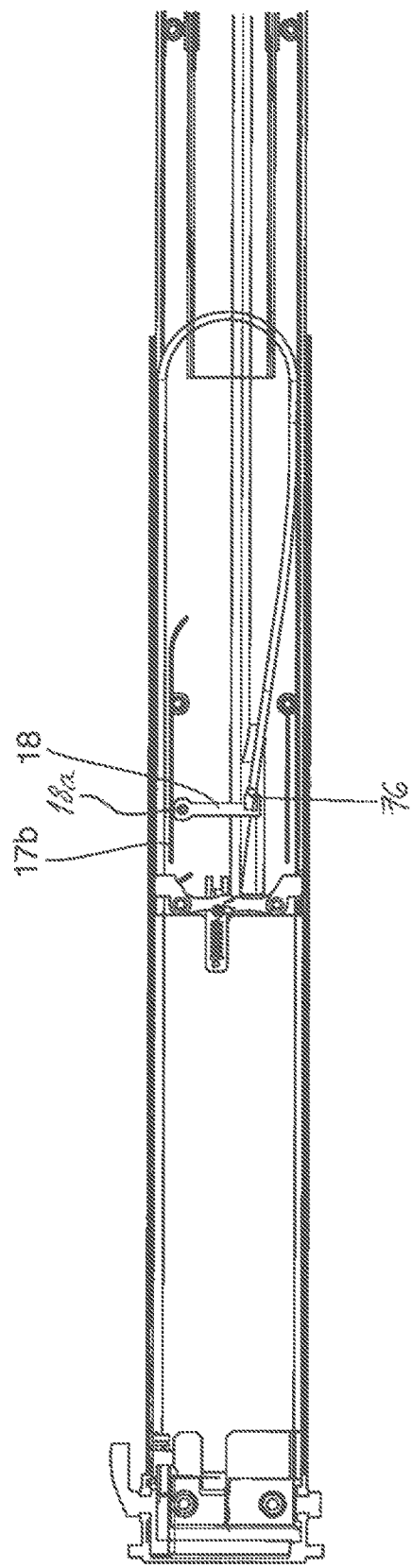
FIG. 3 is a section through the tripod leg of FIG. 1 in further partially extended configuration.

The leg 10 therefore has an outer leg-stage 11a of generally tubular shape. The precise type of tube can be chosen by the designer but is typically a right cylinder having a circular or elliptical cross-section. Slideably mounted within the leg-stage 11a is a middle leg-stage 11b and within the middle leg-stage 11b a third inner leg-stage 11c. When the leg 10 is in its fully retracted configuration as in FIG. 1, the stages 11b, 11c are housed fully within the stage 11a which minimises the storage space required when not in use. However the stages 11b, 11c can be extended from the stage 11a to the required length as shown for example in FIGS. 2 and 3.

In order to facilitate manufacture, then in one alternative, the stage 11a is formed in two main sections which are assembled together. The mechanical elements which are required within the tripod are mounted inside one of the sections before the other section is secured thereto to encase these elements. Seals can be provided (not illustrated) to prevent water ingress into the leg 10.

In order to retain the stage 11c and also to maintain said stage 11c parallel to the stage 11a, as the stage 11c moves relative to the stage 11b, a sleeve 13 is provided. The sleeve 13 is mounted to a series of support ribs 14 extending from the inner surface of the stage 11b. It will be appreciated that the length of the sleeve 13 is sufficient to prevent movement of the stage 11b in a direction non-parallel to the stage's main axis, but is kept as short as possible to minimise the weight of materials used in manufacture of the leg 10.

The stage 11c in FIG. 1 is shown with an optional ground spike 15 at its distal end. In use, the spike 15 engages the ground and can also penetrate softer substrates to stabilise the tripod.

In the region of the leg-stage 11b, proximal to the location of the tripod head (not illustrated), is mounted a first brake or clamping assembly which is operated to prevent or allow relative movement of two stages 11a and 11b as required. The first clamping assembly therefore moves with the leg-stage 11b during extension or retraction. The operation of the clamping assembly is governed by the lever or handle 16, which is moveable by a user between two positions: a clamping position and a release position. In the embodiment shown in FIG. 1, the handle 16 is in the clamping position. It will be appreciated by the skilled person that other means known in the art can be used, such as a press-release button, without departing from the scope of the invention.

The handle 16 is connected to the core element 17a of a cable 17, the core element 17a being housed within a cable sheath 76. The core element is typically a multi-stranded wire 20 although it can be a solid cable. The housing sheath can comprise a helical wire held within or incorporated into a plastic sheath. A nylon or Teflon™ coating can be included within the core element 17a and the housing. A preferred example of a cable is a Bowden cable because a Bowden cable allows the cable to be curved within the leg '10 and still function well. This feature allows the handle 16 to be fixed to the leg stage 11 a such that the handle 16 remains in that position when the leg 10 is moved to its extended configuration. This is in contrast to prior art mechanisms in which the handle is directly linked to and moves with the clamp assembly on extension.

From the handle 16, the cable 17 runs along the leg sections 11a, 11b and within leg section 11b, towards the distal end of the leg section 11b before doubling back to be eventually connected to a balance arm 18 mounted to the inside and moveable with the leg-stage 11b. This 'J' configuration of the cable 17 allows the cable 17 to move freely within the leg 10 when adjustment of the leg length is carried out. The use of a cable within the leg 10 enables a lightweight leg to be constructed which does not need adjustment as often as conventional legs as the cable is able more easily to correct for wear and tear on the mechanism than such conventional legs.

The sheath element of the cable 17 is secured to the balance arm 18, being pivotally mounted to a pivot mount 18a.

The core element 17a within the cable 17 extends further and is secured to a clamp element 19a, the clamp element 19a being pivotally mounted to a pivot mount 20a. Movement of the core element 17a therefore causes the clamp element 19a to pivot about the pivot mount 20a. In doing so the engagement between the male link 21a of the clamp element 19a with a female link 21b on the clamp element 19b causes the clamp element 19b also to pivot, about the pivot mount 20b.

Movement of the core element 17a additionally causes the cable sheath 17 to react against the balance arm 18, causing it to pivot about the pivot mount 18a and pull on the second cable 54 which in turn operates the second clamp elements 50a and 50b.

Figure 4:
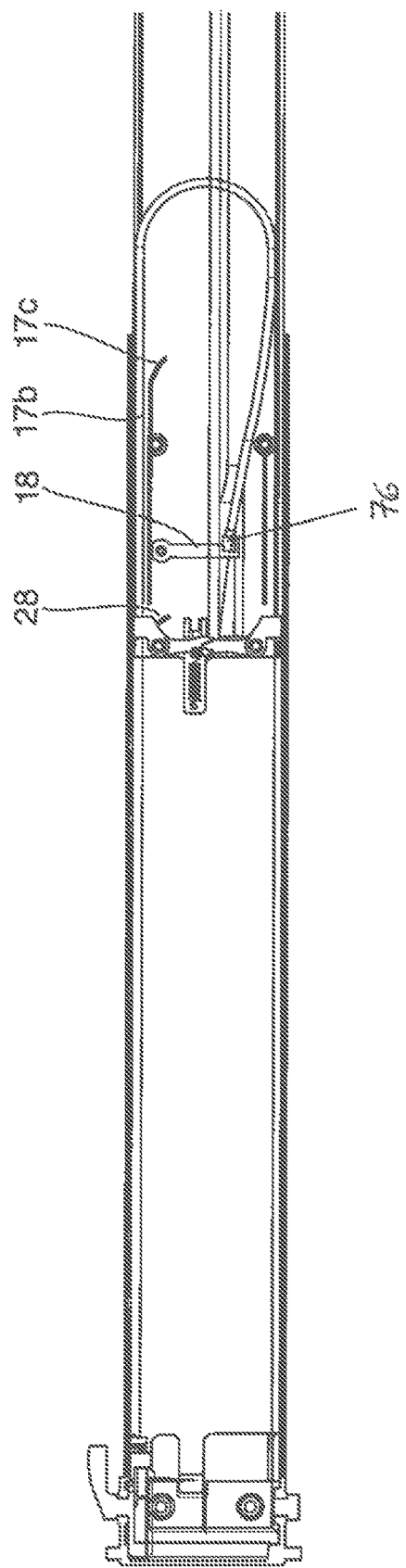
FIG. 4 is a section through the tripod leg of FIG. 1 fully extended.

As can be seen by comparing FIGS. 1 and 4, extension of the leg-stages 11b, 11 c from the leg-stage 11a shortens the section of the cable 17 from the loop in the cable 17 to the balance arm 18 whilst lengthening that section from the handle 16 to the cable loop. To maintain the cable 17 close to the wall of the leg 10, a guide rail 17b is included. The distal end of the guide rail 17b can be seen to be curved inwardly towards the axis of the leg 10. The curvature acts to limit the movement of the leg-stages 11b, 11 c through engagement with the cable 17, with the curvature itself minimising damage to the cable 17 by the end of the guide rail 17b. In an alternative embodiment, not illustrated, the end 17c of the guide rail 17b has a smooth profile or is coated with a low-friction material to minimise abrasion against the cable 17.

Co-mounted to the pivot mounts 20a, 20b are clamp members or leg brakes 22a, 22b. The clamp members 22a, 22b are mounted such that their movement is linked to the pivoting of the clamp elements 19a, 19b; which movement moves the clamp elements between a stage-releasing position (shown in FIG. 6) and a stage-engaging position in which relative movement of the stages 11a, 11b is prevented. It will be appreciated that the clamp elements 19a, 19b and the respective clamp members 22a, 22b can be a unitary object.

The clamping effect therefore occurs as the clamp elements 19a, 19b are moved such that they pass through the apertures 23 in the side walls of the leg-stage 11b and frictionally engage the inner surface of the leg-stage 11a. To increase the effect of the engagement, the ends of the clamp members 22a, 22b can be formed of or coated with a material having a high coefficient of friction such as a rubber or a roughened surface.

Figure 6:
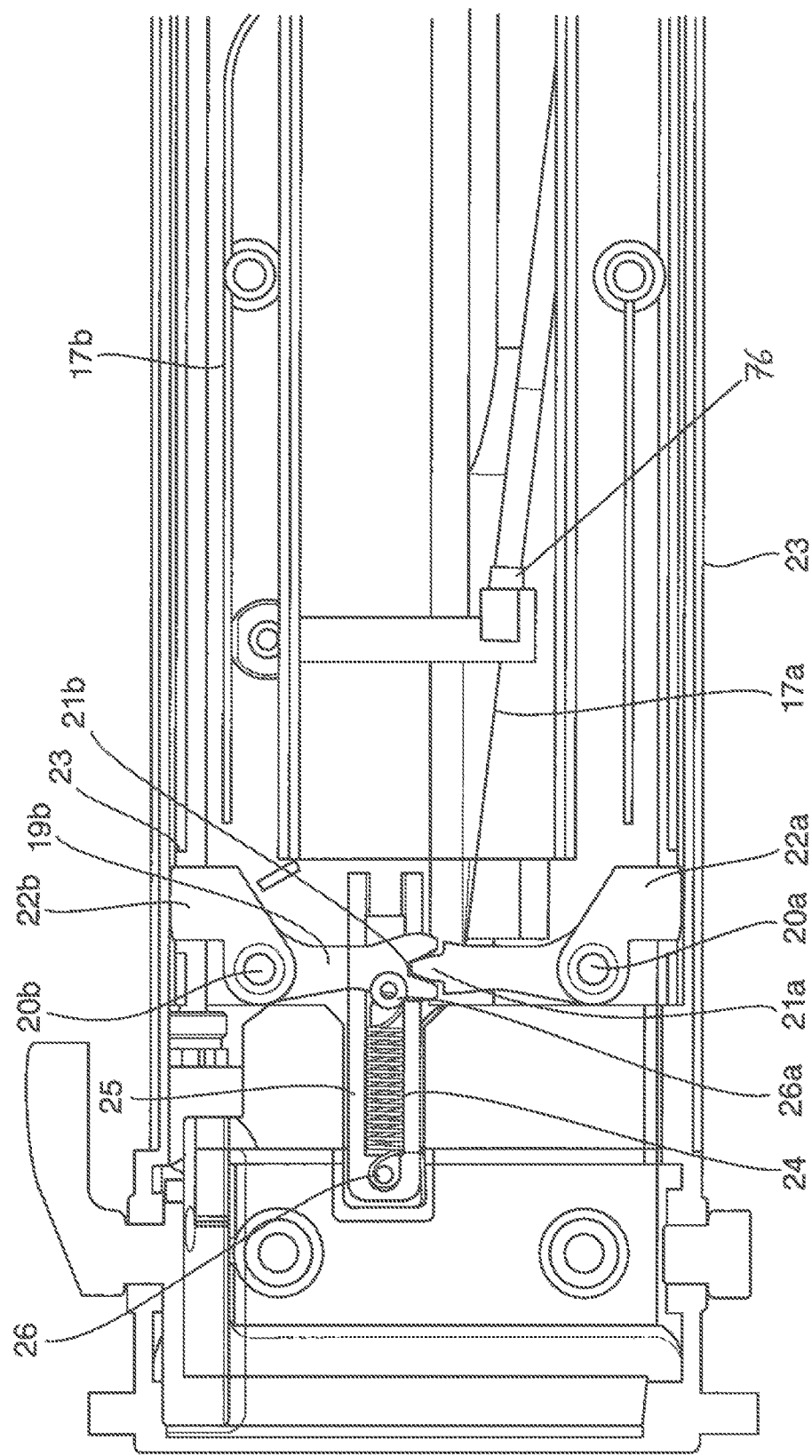
FIG. 6 is an expanded section through the upper end of the tripod leg of FIG. 3 with a clamp element in the retention position.

To assist the users to release the clamp and allow the leg-stages to slide, a spring 24 can be included. Referring to FIG. 6, the spring 24 is held in a spring housing 25 and is secured to a first spring mount 26 located therein. The other end of the spring 24 is mounted to a second spring mount 26a on the clamp element 19b. It will be appreciated that the spring can alternatively be attached to the clamp element 19a or further alternatively to both clamp elements 19a, 19b. An additional spring can also be included: each spring being attached to a separate clamp element. This latter arrangement adds to the overall weight of the leg, but allows proper functioning in the event of a spring becoming inactive.

The second spring mount 26a is advantageously radially displaced from the pivot mount 20b which provides a greater turning force and allows for a relatively weaker and hence more cost-effective spring 24 to be used.

In order to prevent the clamp elements 19a, 19b from pivoting too far as they release the leg-stage 11b, a stop 28 is included. The risk of the clamp elements 19a, 19b accidentally engaging the leg-stage 11c on complete retraction is therefore removed. The stop 28 can also be configured to prevent further retraction of the leg-stage 11c than is desired.

Figure 5:
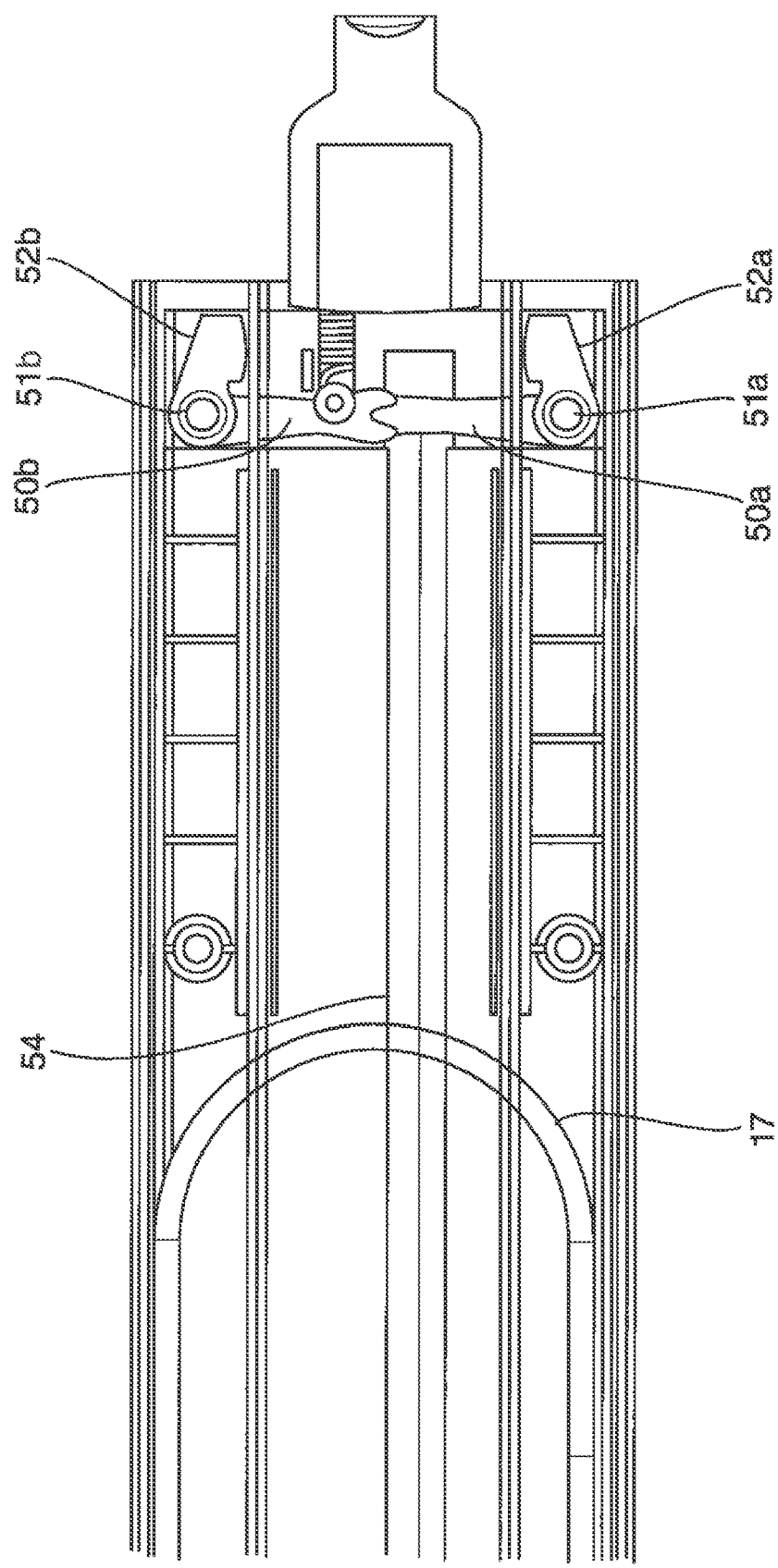
FIG. 5 is an expanded section through the lower end of the tripod leg of FIG. 3 with the clamp element in the release position.

A second clamping assembly is included which acts to prevent relative movement of the middle and inner leg-stages 11b, 11c. The second clamping assembly can be seen in FIGS. 1 and 2 and also in the expanded view of FIG. 5. Operation of the second clamping assembly is via the same handle 16 used for the first clamping assembly and also acts through the first clamping assembly as a slave unit.

Similarly to the first clamping assembly the second assembly has two clamp elements 50a, 50b pivotally mounted at pivot mounts 51a, 51b respectively. Co-mounted to the pivot mounts 51a, 51b are clamp members 52a, 52b. The clamp members 52a, 52b are mounted such that their movement is linked to the pivoting of the clamp elements 50a, 50b which movement moves the clamp elements 50a, 50b radially inwards between a stage-releasing position (shown in FIG. 5) and a stage-engaging position in which movement of the stage 11c is prevented.

Again similarly to the first clamping assembly, a spring biases the second clamp assembly to a leg stage release configuration.

The force to move the clamp elements 50a, 50b is provided by the cable 54 connected at a first end to the outer sheath of the cable 17 via the balance arm 18 and at a second end to the clamp element 50a. Therefore an equal force will be applied to the cable 54 (via the balance arm 18 and the sheath of the cable 17) as is supplied to the core element 17a of the cable 17. The force applied to the clamping elements 19a, 19b (via the core element 17a) will then necessarily be equal to the force supplied to the clamp members 52a, 52b (via the sheath element). It is to be noted that these forces will remain equal even if the movements of the two clamp assemblies are not equal. Therefore if one mechanism operates through a small displacement, either by design or through general wear and tear, the forces will stilt remain equal.

It is essential that equal force is always applied to the two braking or clamping mechanisms in the leg 10, which is in contrast to the prior art known which relies on an equal displacement of the operating mechanism and is typically achieved by means of rotating rods. In prior art mechanisms, even if these are initially adjusted for equal force this would not be maintained over the lifetime of the braking assemblies due to wear and tear of various elements.

Furthermore, by adjusting the attachment points of the cables 17 and 54 on the balance arm 18 it is possible to apportion the forces between the two cables in a fixed proportion defined by the proportions of the lever mechanism.

In an alternative embodiment, not illustrated, the cable consists of two or more sections, one or more of which includes a rigid outer casing and one or more of which includes a flexible outer casing.

In a further alternative embodiment, also not illustrated, the outer casing of the cable is a hinged, rigid-segmented casing of the type often referred to in the art as an energy chain, drag chain or cable chain. In these embodiments, the outer casing typically comprises a linear arrangement of rigid segments with each rigid segment being pivotally mounted to each of the adjacent segments. The cable is thus housed within the internal volume defined by the segments. Such cables are moveable relative to the segments and have the advantage over a Bowden cable of losing less motion in compression in that the outer casing of the Bowden cable compresses, as load is put on the cable which can result in lost motion. Moreover the frictional forces are greater for a Bowden cable when rolling up, for example as two leg stages move relative to one another.

Returning to the coupling of the first with the second clamp assembly, the connections are provided by a connection hole (not illustrated) in the balance arm 18 and clamp element 50a through which a bolt, wire or the like is passed to secure the elements to the cable 54. The cable 54 can simply be a wire and there is no requirement for an outer sheath around this wire as the two ends of the cable 54 remain at a fixed separation from each other. A rod can optionally be used, although for considerations of weight, may be less preferable.

By this means, therefore a single operation of the handle 16 simultaneously acts on all three leg-stages 11a to 11c of the leg 10.

Figure 7:
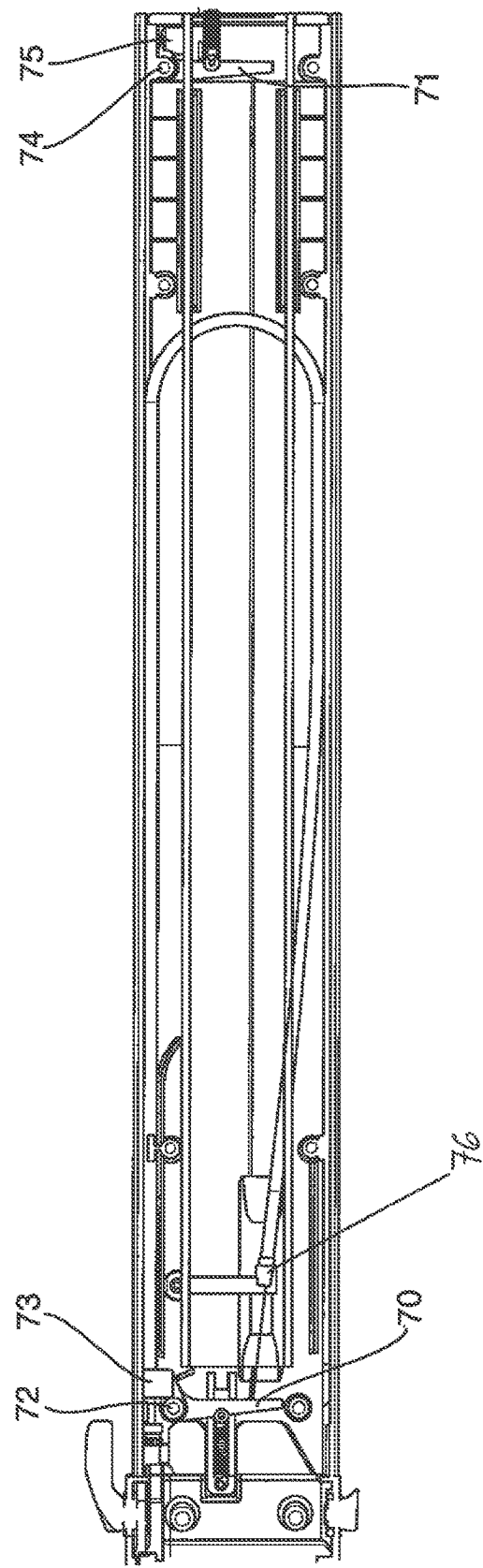
FIG. 7 is a section through a second embodiment of a tripod leg.
Figure 8:
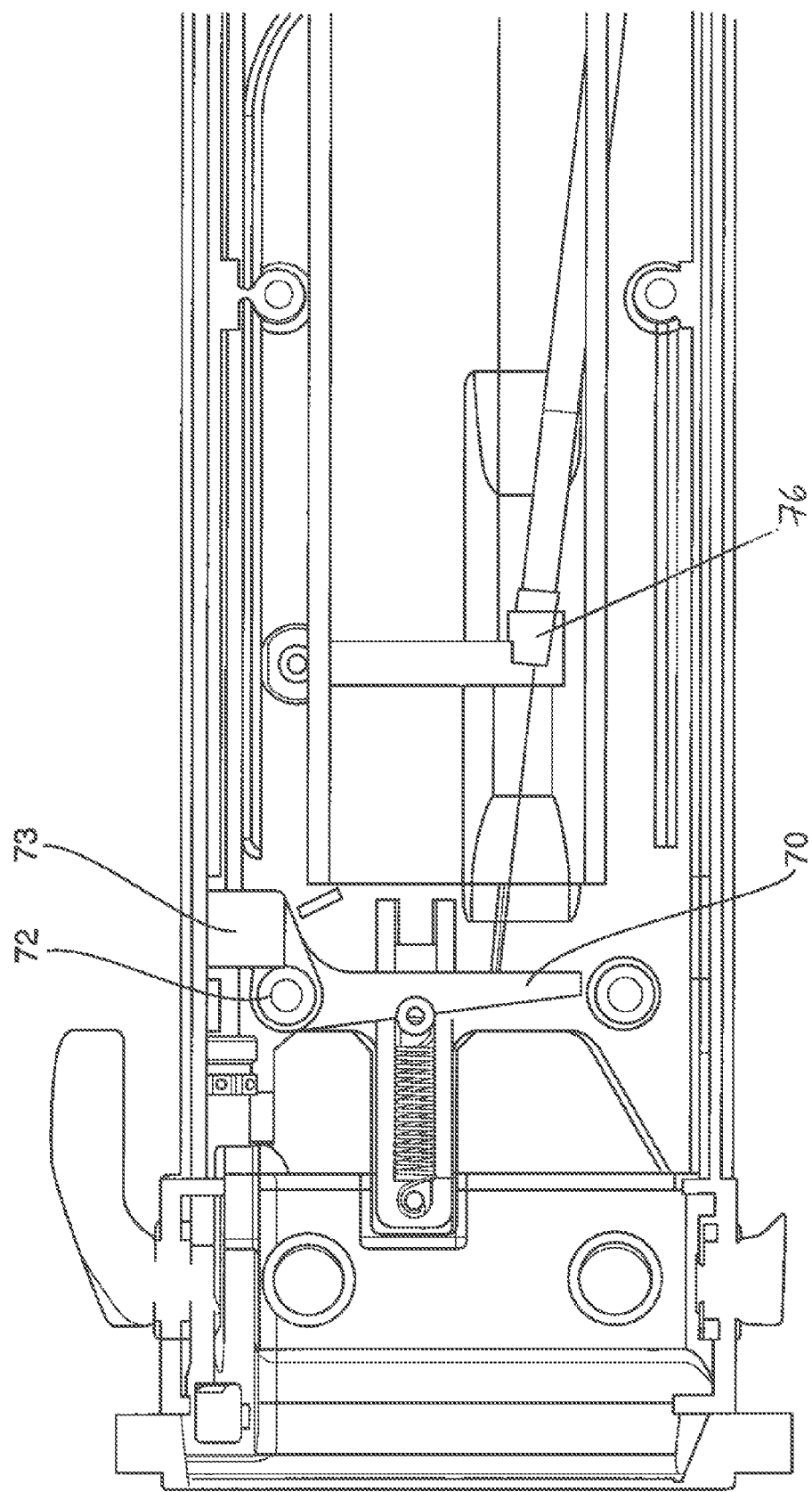
FIG. 8 is an expanded section through the upper end of the tripod leg of FIG. 7.
Figure 9:
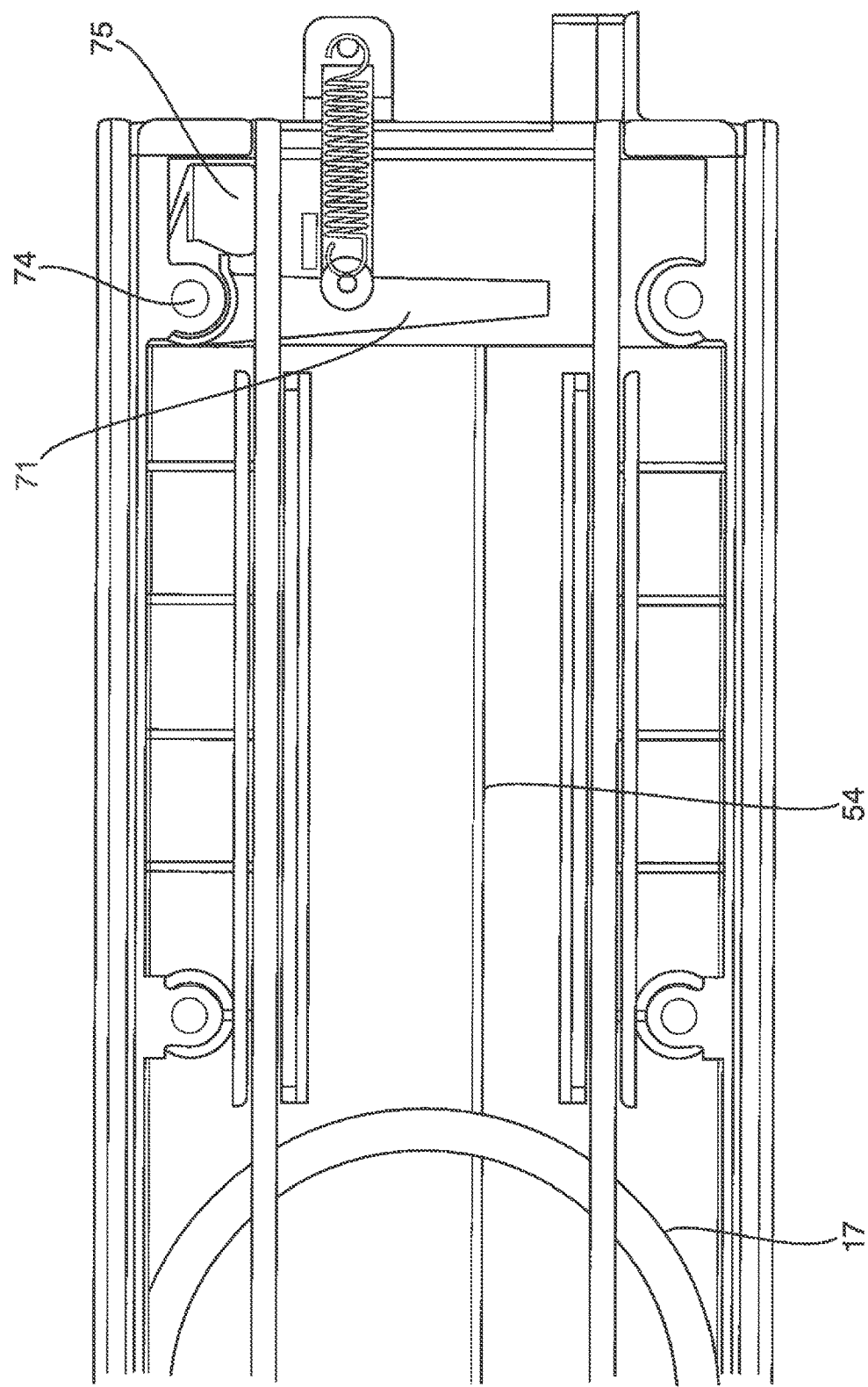
FIG. 9 is an expanded section through the lower end of the second embodiment of tripod leg shown in FIG. 7.

Turning to the second embodiment illustrated in FIGS. 7 to 9, in which the majority of the features described with respect to the first embodiment are also included, then for the second embodiment both the first and second clamp assemblies each have only one clamp element 70, 71 to engage respectively the outer leg 11a and the inner leg 11c.

The clamp element 70 is connected to and operated by—via the cable 17—the handle 16. The operation of said handle 16 to clamp the leg-stages 11a to 11c in position causes the clamp element 70 to pivot about the pivot mount 72 bringing the clamp member 73 into frictional engagement with the inner surface of the leg-stage 11a. Simultaneously, the reaction in the cable sheath of the cable 17 to the force applied to the clamp element 70 is communicated via the balance arm 18 to the cable 54 and hence to the clamp element 71 which therefore pivots about the pivot mount 74 bringing the clamp member 75 into frictional engagement with the outer surface of the leg 11c.

On engagement with the leg-stage 11a, the clamp element 70 exerts an outward radial force against the leg-stage 11a. This is communicated to the leg-stage 11b as a radial force in the opposite direction and pushes the leg-stage 11b into contact against the leg-stage 11a. There arises therefore due to this contact, a frictional force which opposes the relative axial movement, and also any movement about the axis, of the two leg-stages 11a, 11b. This force can be enhanced by the provision of at least a portion of the engaging surfaces having a high coefficient of friction. Similar considerations apply in the action of the clamp element 71 which acts to push the leg-stages 11b and 11c together into frictional engagement with each other.

In addition to the above, the already described features of the assemblies ensure that both brake mechanisms will operate at the same time. Any slack in either the first or the second cables 17, 54 is manifested as lost motion in the operating ever before the brakes operate. Adjustment to remove this slackness can be carried out when the tripod leg is first manufactured and also during its life to allow for wear and tear. But similarly, a single adjustment in either the first or second cables 17, 54 can be used to remove the slack from the operating lever 16.

Preferably, a final adjustment of the cable 17 is provided to take up any slack within the cable 17. This is achieved by the rotary adjustment of a collar on the sheath, which fine tunes the tensioning of the braking assembly. In this fine adjustment, the inner core is moved relative to the outer sheath. The adjustment as herein described is carried out more easily than in the known prior art systems which results in more cost-effective servicing and repair.

The middle leg-stage 11b in which the upper and lower brake assemblies are located can be configured as a back plate and a cover. The brake mechanisms and the first and second cable attachments can be simply constructed and adjusted on the back plate, in addition to the locating means for the upper and lower legs prior to fitting the cover. This simplifies construction.

A disadvantage of this approach is that by splitting the leg-stage its torsional rigidity is greatly reduced. This can affect the performance of the tripod. Restoring the torsional rigidity using a back plate results in a heavier leg compared to its tubular equivalent.

As an alternative, the cover can be in the form of a tube into which the back plate slides. This maintains the high torsional rigidity or a tubular leg whilst keeping the constructional simplicity of using a back plate.

A lighter alternative is to replace the back plate with two end-plugs which contain the clamp assemblies, cable attachments and upper and lower leg-stage location elements. These are individually constructed and then inserted into each end of the leg tube. This provides the lightest of the three solutions and maintains the torsional rigidity of the tubular leg. An additional step is required during construction in order to attach the second cable between the two end plugs after they have been inserted into the leg tube.

The upper brake module includes a feature to enable the winding in and out of the mechanism to enable the attachment and adjustment of the second cable.

The winding out of the mechanism and the mechanism itself is placed within the mouldings which plug into the top and bottom apertures of the legs to simplify the process of manufacture. Furthermore, the mouldings and first cable can be preassembled before loading into the leg.

In use therefore, referring to the first embodiment—although the general principal also applies to the second embodiment—in which the leg 10 is initially in an extended state with both of the leg-stages 11b, 11c extended from the leg-stage 11a, the legs are retracted as follows. The handle 16 at this point is positioned such that the clamp elements act to allow movement of the leg-stages 11b, 11c. Once the desired extension of the leg-stages is achieved, the user operates the handle 16 to move this usually by rotation, to a leg-stage brake or clamp position. As the handle 16 moves, the movement causes a tension to be applied along the core element 17a which acts therefore to pivot the clamp element 19a about the pivot mount 20a and therefore by a virtue of the links 21a, 21b to bring the clamp members 22a, 22b into frictional engagement with the walls of the leg-stage 11a. The movement of the core element 17a also causes an equal and opposite force to be applied to the sheath of the cable 17.

As the core element 17a acts on the clamp elements 19a, 19b the sheath elements 17a simultaneously acts via the balance arm 18 to apply a tension force along the cable 54 in a direction towards the upper in-use end of the leg 10. This causes the cable 54 to pull on the clamp elements 50a, 50b which, as described above brings the clamp members 52a, 52b into frictional engagement with the leg-stage 11c, preventing axial movement of the leg-stage 11c relative to that of the leg-stage 11b.

When it is required to retract the leg 10 to a storage configuration with, for example, the leg-stages 11b, 11c housed within the leg-stage 11a, the handle 16 is rotated to a stage release configuration, which acts to push the core element 17a in the opposite direction to that to prevent movement described above, and the forces therefore act in the opposite direction within the leg 10 to cause the clamp members 22a, 22b and 52a, 52b to move away from the leg-stages 11a, 11c respectively enabling the leg-stages 11a, 11b, 11c to move axially relative to each other. Once the leg 10 is in the retracted configuration the handle 16 is rotated back to the clamp position to prevent further movement and so stop the leg-stages 11b, 11c from sliding out when not required.

It will be appreciated that the mechanism of extending and retracting the leg as described herein is applicable also for tripods or stands for use in supporting broadcast equipment, including but not limited to lighting and audio equipment. In addition, the extension means are also applicable to jibs or cranes having an extendable operating member such as an arm.

The invention claimed is:

1. An extendable leg for a tripod, the extendable leg comprising two or more leg-stages, each leg-stage moveable axially relative to one or more other leg-stages of the two or more leg-stages to lengthen or shorten the extendable leg;
   a first clamp assembly mounted on a first leg-stage, the first clamp assembly including a leg brake moveable between a first leg-stage locking position and a second leg-stage release position;
   actuation means fixed to a second leg-stage, the actuation means controlling movement of the leg brake between the first leg-stage locking position and the second leg-stage release position;
   wherein the first clamp assembly is operable to releasably prevent relative movement of the first leg-stage and the second leg-stage when the extendable leg is at a desired length;
   the extendable leg further comprising a cable operably connected at a first end to the actuation means and at a second end to the leg brake of the first clamp assembly, such that operation of the actuation means causes the cable to move the leg brake thereby allowing for relative movement between the actuation means and the leg brake.

2. The extendable leg for a tripod according to claim 1, wherein the cable is a Bowden cable having a central wire encased in a flexible tubular casing.

3. The extendable leg for a tripod according to claim 1, wherein the cable comprises two or more sections, one or more of which includes a rigid outer casing and one or more of which includes a flexible outer casing.

4. The extendable leg for a tripod according to claim 1, wherein the leg brake includes a first arm having a distal end leg engagement means to frictionally engage a leg-stage surface and prevent the relative movement of the first leg-stage and the second leg-stage.

5. The extendable leg for a tripod according to claim 4, wherein the leg brake is pivotably mounted, pivoting action bringing the leg brake from a leg release position to a leg locking position.

6. The extendable leg for a tripod according to claim 4, wherein the leg brake is mounted on a rack and pinion mechanism to move the leg brake between two positions.

7. The extendable leg for a tripod according to claim 4, wherein the leg brake includes a second arm, wherein the second arm is also pivotably mounted and linked to the first arm such that pivoting of the first arm causes the second arm to move between a first position and a second position.

8. The extendable leg for a tripod according to claim 7, wherein the second arm includes at a distal end a leg engagement means to engage a leg surface and resist movement, and wherein a link between the first arm and the second arm is provided by a fishtail arrangement.

9. The extendable leg for a tripod according to claim 1, wherein the extendable leg includes a spring attached to a first arm, and biasing the first arm to a non-engaging position.

10. The extendable leg for a tripod according to claim 1, wherein the extendable leg includes a guide sleeve or a guide rail to maintain axial alignment between leg-stages.

11. The extendable leg for a tripod according to claim 10, wherein an end of the guide rail is curved axially inwardly.

12. The extendable leg for a tripod according to claim 11, wherein the extendable leg includes three leg-stages, namely an outer leg-stage, a middle leg-stage and an inner leg-stage, and further includes a second clamp assembly, the first clamp assembly and the second clamp assembly being mounted to the middle leg-stage, the first clamp assembly acting to releasably prevent relative movement of the outer leg-stage and the middle leg-stage and the second clamp assembly acting to releasably prevent relative movement of the middle leg-stage and the inner leg-stage.

13. The extendable leg for a tripod according to claim 12, wherein a second assembly is operatively linked by one of a wire or rod to the first clamp assembly, actuation of the first clamp assembly causing leg brake actuation of the second clamp assembly.

14. The extendable leg for a tripod according to claim 13, wherein the wire or rod is attached at a first end to a tubular casing of a Bowden cable which operates the first clamp assembly and at a second end to the leg brake of the second clamp assembly.

\* \* \* \* \*